(12) United States Patent
Ichikawa

(10) Patent No.: US 11,188,242 B2
(45) Date of Patent: Nov. 30, 2021

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Ken Ichikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/533,799

(22) Filed: Aug. 7, 2019

(65) Prior Publication Data
US 2020/0278803 A1 Sep. 3, 2020

(30) Foreign Application Priority Data
Mar. 1, 2019 (JP) .............................. JP2019-037396

(51) Int. Cl.
*G06F 3/06* (2006.01)
*G06F 12/02* (2006.01)

(52) U.S. Cl.
CPC ............ *G06F 3/0631* (2013.01); *G06F 3/067* (2013.01); *G06F 3/0608* (2013.01); *G06F 3/0629* (2013.01); *G06F 3/0637* (2013.01); *G06F 3/0643* (2013.01); *G06F 12/023* (2013.01)

(58) Field of Classification Search
CPC .... G06F 3/0631; G06F 3/0608; G06F 3/0637; G06F 3/0643; G06F 3/067; G06F 12/023; G06F 3/0629; G06F 3/0673; G06F 3/0644
See application file for complete search history.

(56) References Cited

U.S. PATENT DOCUMENTS

| | | | | |
|---|---|---|---|---|
| 7,017,016 | B2* | 3/2006 | Chujo | G06F 16/122 711/147 |
| 8,086,652 | B1* | 12/2011 | Bisson | G06F 3/067 707/823 |
| 9,122,579 | B2* | 9/2015 | Flynn | G06F 12/023 |
| 9,344,433 | B2* | 5/2016 | Adams | G06Q 10/101 |
| 2012/0194837 | A1 | 8/2012 | Kamata | |
| 2013/0046833 | A1* | 2/2013 | Riepling | G06Q 10/10 709/206 |

FOREIGN PATENT DOCUMENTS

| | | |
|---|---|---|
| JP | 2012156824 | 8/2012 |
| JP | 2015228194 | 12/2015 |

* cited by examiner

*Primary Examiner* — Idriss N Alrobaye
*Assistant Examiner* — Richard B Franklin
(74) *Attorney, Agent, or Firm* — JCIPRNET

(57) ABSTRACT

An information processing apparatus includes a securing section that secures a storage area in a shared server and a control section that changes a secured capacity of the storage area according to a storage status of the storage area after the storage area is secured by the securing section.

21 Claims, 15 Drawing Sheets

FIG. 10

DOCUMENT RECEIPT

LINK THROUGH WHICH DOCUMENT CAN BE UPLOADED IS TRANSMITTED BY MAIL.
PERSON WHO HAS RECEIVED MAIL CAN UPLOAD DOCUMENT WITHOUT LOGGING IN BY
ACCESSING FROM LINK WITHIN EFFECTIVE TIME LIMIT.
IN CASE WHERE YOU WANT TO SET PASSWORD, PASSWORD CAN BE SET FROM BUTTON
ON LOWER LEFT OF PAGE.

NAME:

MAIL DESTINATION:

EFFECTIVE TIME LIMIT OF DOCUMENT RECEIPT:

TITLE OF OUTGOING MAIL:

DETAILED SETTING        CANCEL        OK

FIG. 11

DETAILED SETTING

PASSWORD: ☐

UPPER LIMIT OF SIZE OF FILE THAT CAN BE UPLOADED: ☐

UPPER LIMIT OF NUMBER OF FILES THAT CAN BE UPLOADED: ☐

[ CANCEL ]  [ OK ]

FIG. 12

NAME: DOCUMENT RECEIPT

REQUESTER: TARO FUJI

DOCUMENT RECEIPT URL:

https://··············································

EFFECTIVE TIME LIMIT: MARCH 31, 2019

FIG. 15

CAPACITY INCREASE REQUEST

UPLOAD CANNOT BE PERFORMED SINCE DESIGNATED CAPACITY IS EXCEEDED BY 20 MB.
DO YOU WANT TO MAKE CAPACITY INCREASE REQUEST?

| NO | YES |

AREA INCREASE REQUEST IS RECEIVED FROM USER A IN RESPONSE TO UPLOAD REQUEST.
IN CASE OF APPROVING INCREASE, PLEASE INCREASE THROUGH LINK BELOW.

https://······························

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-037396 filed Mar. 1, 2019.

BACKGROUND

(i) Technical Field

The present invention relates to an information processing apparatus and a non-transitory computer readable medium storing a program.

(ii) Related Art

A technique of uploading a file such as a document to a shared server is known in the related art.

A technique of saving an upload target folder in another area having an empty capacity when the upload target folder reaches an upper limit capacity, in a case where a capacity is limited per folder, is disclosed in JP2015-228194A.

A technique of temporarily saving a file, which exists in a target area, in a save area in a case where the file exceeding an upper limit capacity is uploaded is disclosed in JP2012-156824A.

SUMMARY

In a case where a storage area for a file such as a document is secured in the shared server and a secured capacity is fixed, and when a capacity of a file that a user actually stores exceeds the secured capacity, the file cannot be stored, or it is necessary to save the file in an area different from the secured storage area. In addition, in a case where the secured capacity is excessively large, the large capacity limits another user of the shared server in using the server.

Aspects of non-limiting embodiments of the present disclosure relate to an information processing apparatus and a non-transitory computer readable medium storing a program that provide a storage area having an appropriate capacity according to an actual storage status to a user after the storage area is secured in a shared server.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a securing section that secures a storage area in a shared server and a control section that changes a secured capacity of the storage area according to a storage status of the storage area after the storage area is secured by the securing section.

BRIEF DESCRIPTION OF THE DRAWINGS

Exemplary embodiment(s) of the present invention will be described in detail based on the following figures, wherein:

FIG. 10 is a (first) explanatory diagram showing an example of a screen of the exemplary embodiment;

FIG. 11 is a (second) explanatory diagram showing an example of the screen of the exemplary embodiment;

FIG. 12 is a (third) explanatory diagram showing an example of the screen of the exemplary embodiment;

FIG. 13 is a (fourth) explanatory diagram showing an example of the screen of the exemplary embodiment;

FIG. 14 is a (fifth) explanatory diagram showing an example of the screen of the exemplary embodiment;

FIG. 15 is a (sixth) explanatory diagram showing an example of the screen of the exemplary embodiment;

FIG. 16 is a (seventh) explanatory diagram showing an example of the screen of the exemplary embodiment;

DETAILED DESCRIPTION

Hereinafter, an exemplary embodiment of the present invention will be described based on the drawings with a server/client system given as an example.

Figure 1:
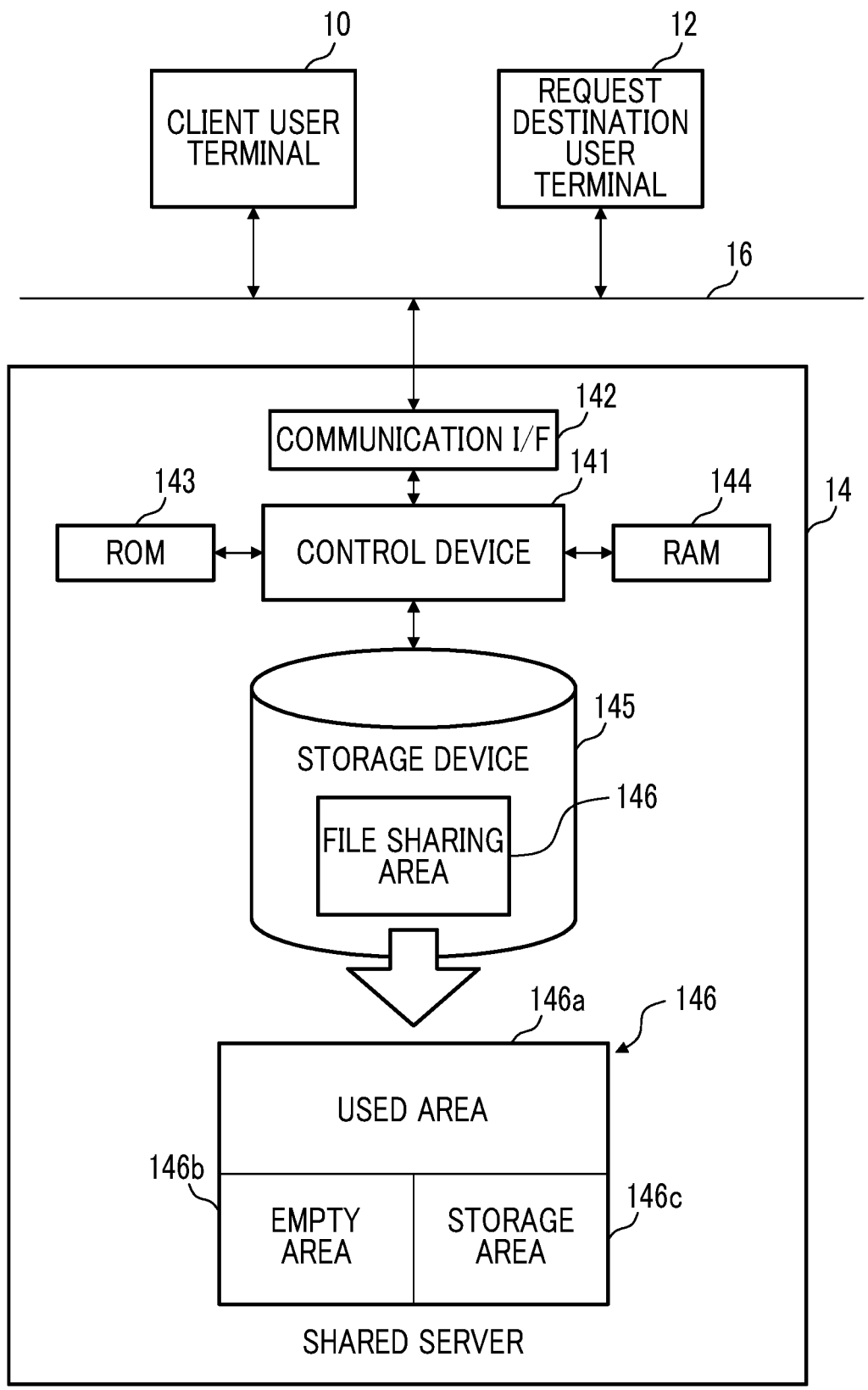
FIG. 1 is an overall configuration diagram of an exemplary embodiment.

FIG. 1 is an overall configuration diagram of an information processing apparatus of the exemplary embodiment. The information processing apparatus includes a client user terminal 10 operated by a user, who is a client requesting the upload of a file such as a document, a request destination user terminal 12 operated by a request destination user, who is requested to upload a file such as a document, and a shared server 14. The client user terminal 10, the request destination user terminal 12, and the shared server 14 are connected by a communication network 16 such that data can be transmitted and received therebetween. The communication network 16 may be any one of a public line or a private line, and may be any one of a wired line or a radio line.

The client user terminal 10 is a personal computer (PC), a tablet terminal, or an information mobile terminal such as a smartphone, includes a processor or a memory, an input and output device, and a communication interface (I/F), and requests the upload of a file such as a document via the communication network 16.

The request destination user terminal 12 is a personal computer (PC), a tablet terminal, or an information mobile terminal such as a smartphone, includes a processor or a memory, an input and output device, and a communication interface (I/F), receives a request to upload a file such as a document via the communication network 16, and uploads a file such as a document to the shared server 14 via the communication network 16 according to the request.

The shared server 14 is a server computer, and includes a control device 141, a communication interface (I/F) 142, a ROM 143, a RAM 144, and a storage device 145. The control device 141 is configured with one or a plurality of processors, reads a processing program stored in a program memory of the ROM 143, and realizes various types of processing by executing the processing program. In a case where an upload request is received from the client user terminal 10 via the communication I/F 142, the control device 141 secures a storage area 146c in a file sharing area 146 of the storage device 145.

The file sharing area 146 in the storage device 145 is an area that can be shared by a plurality of users, and an upper limit capacity thereof is determined in advance. The control device 141 secures the storage area 146c in an empty area 146b excluding an already used area 146a of the file sharing area 146. That is, the following is satisfied.

(Upper limit capacity of file sharing area−Used capacity)≥Secured capacity

In a case of considering that it is also necessary to provide a user other than the request destination user with the file sharing area 146, the following is appropriate.

(Upper limit capacity of file sharing area−Used capacity)>Secured capacity

A secured capacity of the storage area 146c may be a fixed value determined in advance, or may be a value according to a request from the client user terminal 10. The storage device 145 can be configured with a hard disk drive (HDD) or a solid state disk (SSD). In addition, the storage device 145 does not necessarily have to be incorporated into the shared server 14, and may be connected to the shared server 14 by the communication network 16.

In a case where the storage area 146c is secured, the control device 141 transmits a notification of requesting the upload of a file such as a document to the request destination user terminal 12 via the communication network 16. In this notification, identification information for identifying the storage area 146c secured in the file sharing area 146 is included. Although the identification information can take any form, the identification information can be set to, for example, a uniform resource locator (URL).

In a case where a file such as a document is received from the request destination user terminal 12 via the communication network 16, the control device 141 stores the file in the storage area 146c. In addition, the control device 141 monitors a storage status of a file in the storage area 146c, and changes the secured capacity of the storage area 146c according to the storage status. The presence or absence of a stored file such as a document, a stored timing, the quality of storage, the amount of storage, and a storer can be included in a storage status. The quality of storage includes an attribute of a stored file. The amount of storage includes a stored file size and the number of files. The storer includes a person who stores a file.

A change in the secured capacity means changing an initial state of the secured capacity, and the change in the secured capacity includes at least any one of an increase or a decrease. The increase includes an increase in a fixed amount and an increase in a variable amount. A decrease in the secured capacity includes a decrease in a fixed amount and a decrease in a variable amount. In particular, the decrease in the secured capacity also includes release of the secured capacity, that is, for example, making the secured capacity zero.

In addition to a case where any one of an increase or a decrease in the secured capacity is executed, a case where both of an increase and a decrease in the secured capacity are executed is also possible. That is, the secured capacity is decreased after increasing, or the secured capacity is increased after decreasing.

In addition to a case where the control device 141 automatically changes the secured capacity in accordance with the processing program, the change in the secured capacity also includes a case where the secured capacity is changed according to a request from the client user terminal 10 or a request from the request destination user terminal 12.

In FIG. 1, the control device 141 and the storage device 145 each function as a securing section that secures the storage area 146c in the shared server 14, and the control device 141 functions as a control section that changes the secured capacity of the storage area 146c according to a storage status of the storage area 146c. Some functions of the control device 141 may be realized by hardware processing instead of software processing through execution of a program. The hardware processing may be performed, for example, by using a circuit such as an ASIC and a field programmable gate array (FPGA).

Figure 2:
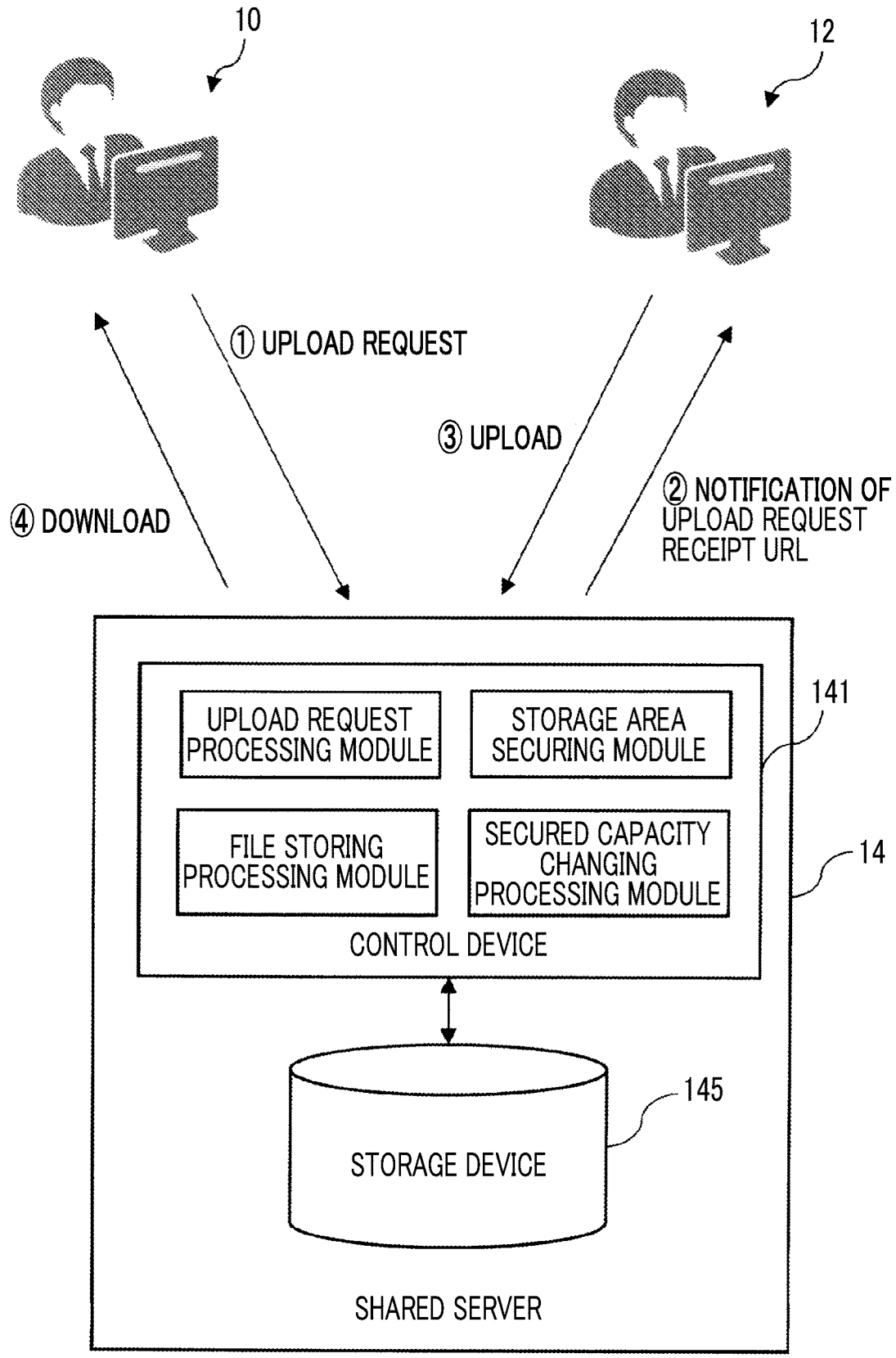
FIG. 2 is an explanatory diagram of data flow of the exemplary embodiment.

Processing by the control device 141 is as follows.
To receive an upload request of a file such as a document from the client user terminal 10
To secure the storage area 146c in the file sharing area 146 of the storage device 145 according to an upload request, and to assign the request destination user to the secured storage area 146c
To notify the request destination user terminal 12 of an upload request
To receive transmission (upload) of a file such as a document from the request destination user terminal 12
To store a received file in the storage area 146c secured in the file sharing area 146
To monitor a storage status of the storage area secured in the file sharing area
To change the secured capacity of the storage area according to a storage status FIG. 2 shows data flow among the client user terminal 10, the request destination user terminal 12, and the shared server 14 via the communication network 16.

The client user terminal 10 and the request destination user terminal 12 transmit and receive a file via the shared server 14. In order to execute each processing described above, the control device 141 of the shared server 14 includes an upload request processing module, a storage area securing module, a file storing processing module, and a secured capacity changing processing module as function modules. Herein, the "module" means a component such as logically separable software and hardware. Although the module may correspond to a function one on one, one module may be configured with one program, or a plurality of modules may be configured with one program. In addition, a plurality of modules may be executed by one processor, or may be executed by a plurality of processors in a distributed or parallel environment. In processing by each module, target information is read, processing is performed by a processor such as a CPU, and then a processing result is output.

The client user terminal 10 identifies request destination user information for requesting upload and request target file information for requesting upload, and transmits the information to the shared server 14. The client user downloads an application program for using the shared server 14 in advance from the shared server 14 to install in the client user terminal 10, starts the application program to identify request destination user information for requesting upload and request target file information for requesting upload, and thereby can transmit the information to the shared server 14. The client user may identify request destination user information for requesting upload and request target file information for requesting upload to transmit the information to the shared server 14 by using a web application program that operates on a web browser.

The upload request processing module of the control device 141 in the shared server 14 receives a request from the client user terminal 10. The storage area securing module secures the storage area 146*c* in the file sharing area 146 of the storage device 145 in response to receipt of the upload request. The secured capacity of the storage area 146*c* may be a fixed value determined in advance, for example, 5 MB, or may be set according to file information included in an upload request from the client user terminal 10. For example, in a case where a file size upper limit value, which is one type of file information, is identified as 10 MB, the storage area securing module secures the secured capacity by setting the secured capacity to 10 MB. In a case of securing the storage area 146*c*, the storage area securing module checks the upper limit capacity and the used area of the file sharing area 146, and secures the storage area 146*c* within a range that satisfies the following.

(Upper limit capacity of file sharing area−Used capacity)>Secured capacity

In addition, in a case where the storage area 146*c* is secured, the storage area securing module generates a URL for accessing the storage area 146*c* and sends the URL to the upload request processing module. In a case where the storage area securing module secures the storage area 146*c*, the upload request processing module transmits a notification of an upload request of a file such as a document to the request destination user terminal 12. A notification destination can be identified from request destination user information included in a request from the client user terminal 10. In addition, information for accessing the secured storage area 146*c* is included in the notification, and specifically is the URL of the storage area 146*c*, which is generated by the storage area securing module.

The request destination user terminal 12 receives a notification from the shared server 14, accesses the storage area 146*c* by using information for accessing the storage area 146*c*, and transmits (uploads) a request target file included in request target file information identified by the client user terminal 10 to the shared server 14.

The file storing processing module receives the request target file transmitted from the request destination user terminal 12, and checks a file size thereof. Then, in a case where the file size is equal to or smaller than the secured capacity, the request target file is stored in the storage area 146*c*. On the other hand, in a case where the file size exceeds the secured capacity, the request target file cannot be stored in the storage area 146*c* as it is. Thus, error processing determined in advance is executed. The error processing includes sending a notification indicating that the secured capacity is exceeded to the request destination user terminal 12 and increasing the secured capacity. In a case where the request target file is stored, the file storing processing module notifies the client user terminal 10 of the fact that the request target file is stored. In a case where this storing notification is received, the client user terminal 10 accesses the storage area of the shared server 14 at an appropriate timing, and downloads the stored request target file. The file storing processing module reads the file stored in the storage area 146*c* in response to a request from the client user terminal 10 and transmits the file to the client user terminal 10, thereby performing download.

The secured capacity changing processing module monitors a storage status of a file in the storage area in parallel with file storing processing by the file storing processing module, and changes the secured capacity of the storage area 146*c* according to the storage status. In a case where a file is stored by the file storing processing module, the secured capacity changing processing module controls the secured capacity to decrease under certain conditions. In addition, also in a case where a file is not stored by the file storing processing module, the secured capacity changing processing module controls the secured capacity to decrease. In a case where the file storing processing module has determined that the file size exceeds the secured capacity, the secured capacity changing processing module controls the secured capacity to increase under certain conditions in response to this determination.

Although the client user who operates the client user terminal 10 is a registered user who has authority to use the shared server 14 in the exemplary embodiment, the request destination user who operates the request destination user terminal 12 may be, in addition to being a registered user who has authority to use the shared server 14, an unregistered user who does not have authority to use the shared server 14. In a case of the latter, an upload request from the client user terminal 10 can be seen as giving the unregistered user temporary authority to use the shared server 14. In a case of giving the unregistered user the temporary authority to use the shared server 14, it is necessary to secure the storage area 146*c* that can be used by the unregistered user in the shared server 14, but an initial secured capacity of the storage area 146*c* is not an appropriate capacity in many cases. That is, a case where the secured capacity is excessively smaller than a file size to be uploaded is caused, or the secured capacity is made excessively large with a margin. Thus, the file sharing area 146 that can be used by other users decreases, and thereby convenience reduces. In a case where the registered user knows a file size of a request target, of which upload is being requested, in advance, an appropriate secured capacity can be initially set according to the file size. However, in a case where the file size is unknown or inaccurate, a margin is left just in case. As a result, there are many cases where an initial secured capacity becomes excessively large. In a case of requesting such an unregistered user to upload, for example, requesting a client who is in a business alliance to upload a certain file and securing the storage area 146*c* under circumstances where a file size, which is a request target, is unknown, the exemplary embodiment is considered to be effective.

Figure 3:
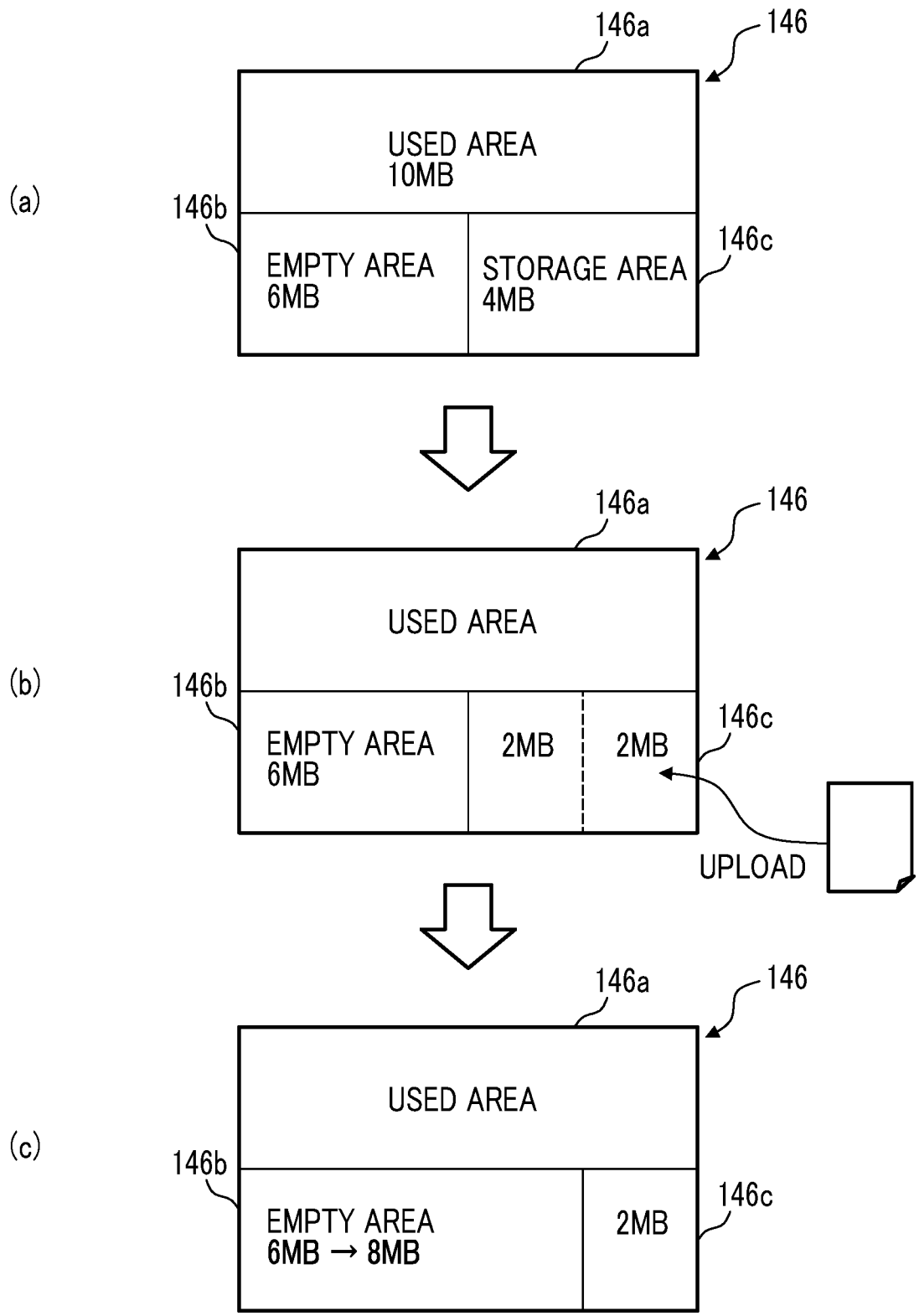
FIG. 3 is a (first) schematic diagram showing a change in a secured capacity of the exemplary embodiment.

FIG. 3 schematically shows a secured capacity change of the storage area 146*c* according to a storage status, which is executed by the control device 141.

A part (a) of FIG. 3 shows an initial state of the storage area 146*c*. The control device 141 secures the storage area 146*c*, which is assigned to the request destination user, of the empty area 146*b* excluding the used area 146*a* of the file sharing area 146. For example, in a case where the file sharing area is 20 MB, the used area 146*a* is 10 MB, and the empty area 146*b* is 10 MB, 4 MB, out of 10 MB of the empty area, is secured as the storage area 146*c*. Secured capacity=4 MB is satisfied. In a case where there is the upload of a file such as a document to the shared server 14 from the request destination user terminal 12 in this initial state, the control device 141 receives and stores the uploaded file in the storage area 146*c*. The size of the uploaded file such as a document is, for example, 2 MB.

A part (b) of FIG. 3 shows a state where the uploaded file is stored in the storage area 146*c*. For example, in a case where the secured capacity of the storage area 146*c* is 4 MB and the stored file size is 2 MB, a remaining capacity in the storage area 146*c* is 2 MB. In a case of not changing the secured capacity, the remaining capacity of 2 MB is maintained as it is.

A part (c) of FIG. 3 shows a state where the secured capacity of the storage area 146*c* is changed. The remaining capacity in the storage area 146*c* is released, that is, becomes 0 MB from 2 MB, and the empty area 146*b* increases from 6 MB to 8 MB. That means that in a case where a file, which is a request target, is uploaded and stored in the storage area 146*c*, the storage area 146*c* is forcibly released and decreased until zero even though there is a remaining capacity in the storage area 146*c*. In a case where the secured capacity of the storage area 146*c* becomes zero, it is evident that a file cannot be uploaded from the request destination user terminal 12. On the other hand, since the empty area 146*b* of the file sharing area 146 increases by the released remaining capacity by making the secured capacity of the storage area 146*c* zero, a usable area by a user other than the request destination user (regardless of a registered user or an unregistered user) increases.

Figure 4:
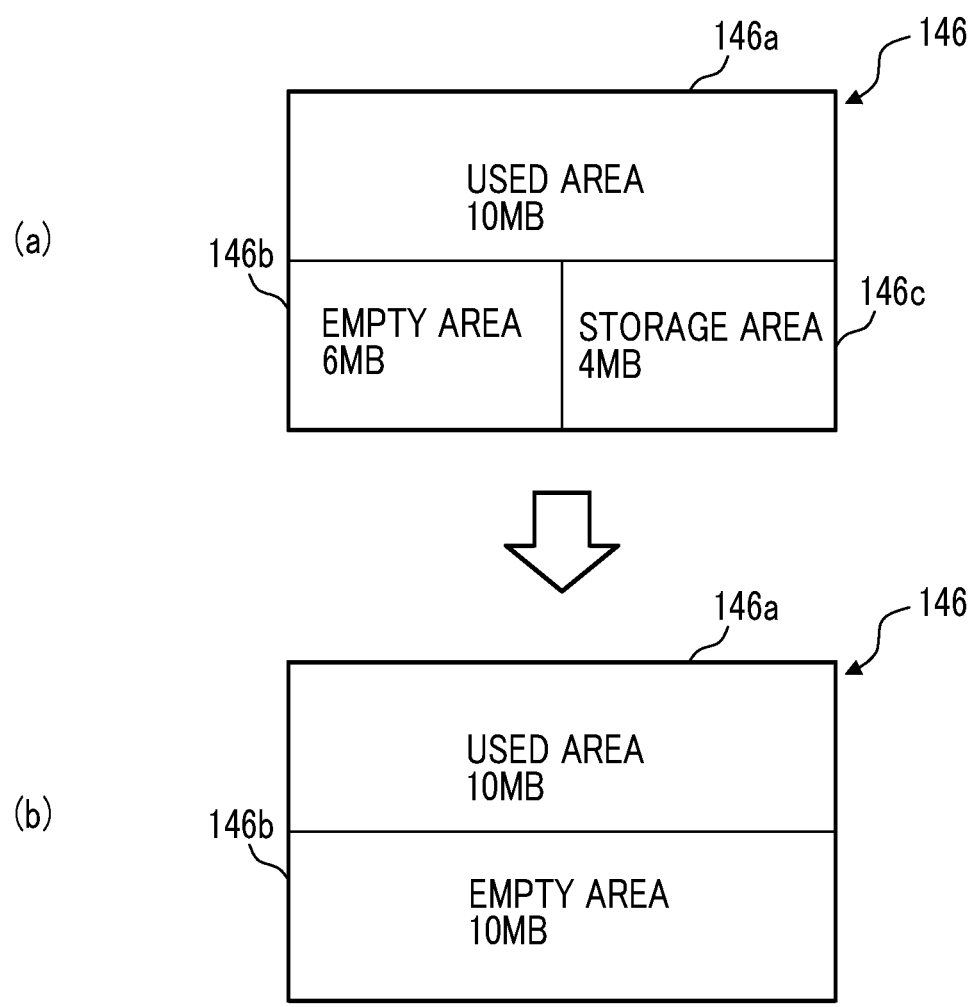
FIG. 4 is a (second) schematic diagram showing the change in the secured capacity of the exemplary embodiment.

FIG. 4 schematically shows another secured capacity change of the storage area according to a storage status, which is executed by the control device 141.

Apart (a) of FIG. 4 shows an initial state of the storage area. As in the part (a) of FIG. 3, for example, 4 MB, out of 10 MB of the empty area, is secured as the storage area 146*c*. That is, secured capacity=4 MB is satisfied.

Apart (b) of FIG. 4 shows a state in a case where a file, which is a request target, is not uploaded from the request destination user terminal 12 within a certain time limit after the storage area 146*c* is secured in the file sharing area 146, or after the control device 141 transmits an upload request notification to the request destination user terminal 12. The storage area 146*c* is released from the initial state of 4 MB, and is decreased to 0 MB. With this, the empty area 146*b* increases from 6 MB to 10 MB. A usable area by a user other than the request destination user (regardless of a registered user or an unregistered user) increases by releasing the storage area 146*c* and increasing the empty area 146*b*.

Figure 5:
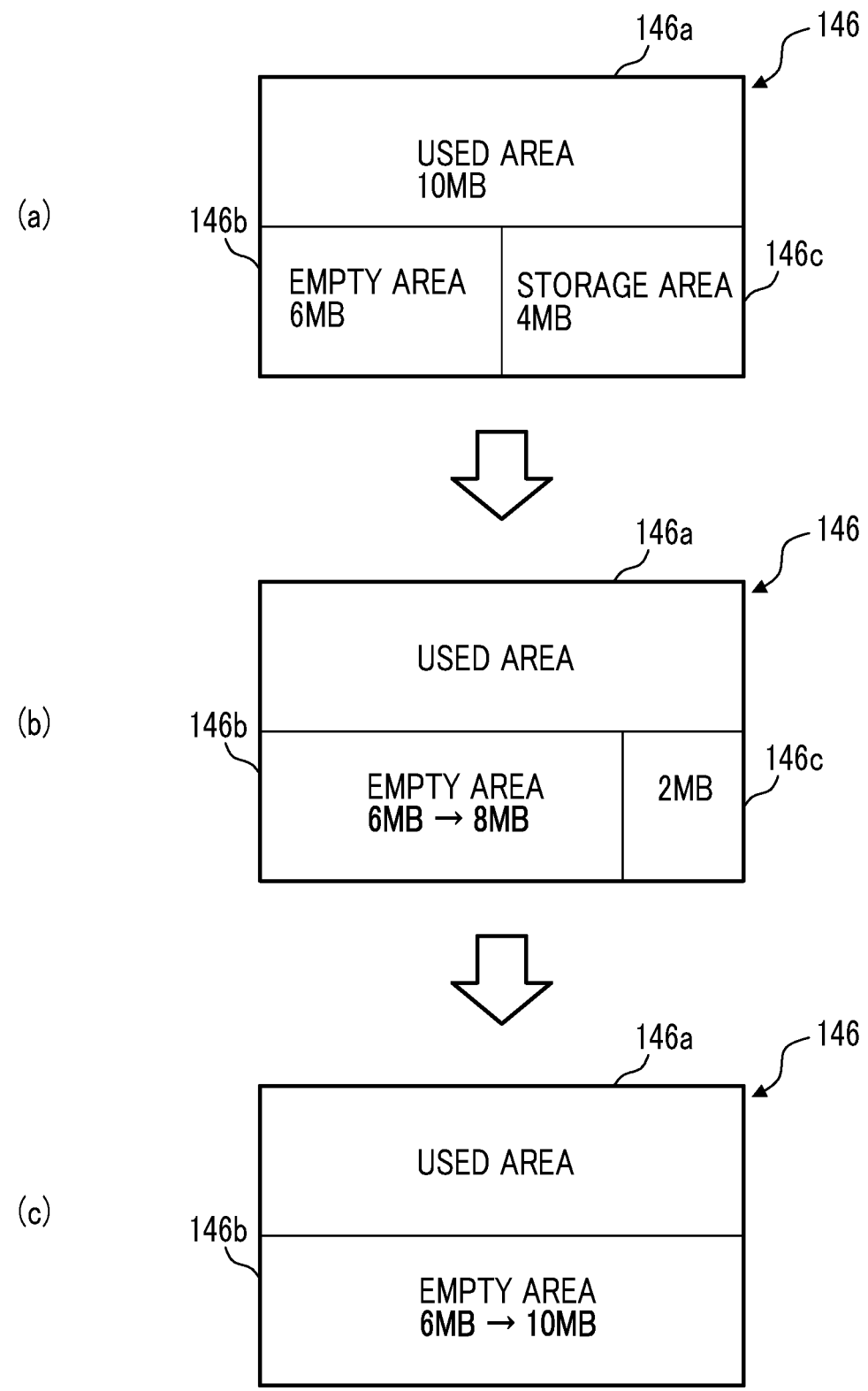
FIG. 5 is a (third) schematic diagram showing the change in the secured capacity of the exemplary embodiment.

FIG. 5 schematically shows still another secured capacity change of the storage area according to a storage status, which is executed by the control device 141.

Apart (a) of FIG. 5 shows an initial state of the storage area. As in the part (a) of FIG. 3, for example, 4 MB, out of 10 MB of the empty area, is secured as the storage area 146*c*. That is, secured capacity=4 MB is satisfied.

Apart (b) of FIG. 5 shows a state in a case where a file, which is a request target, is not uploaded from the request destination user terminal 12 within a certain time limit after the storage area 146*c* is secured in the file sharing area 146, or after the control device 141 transmits an upload request notification to the request destination user terminal 12. The storage area 146*c* is released from the initial state of 4 MB by 2 MB, and is decreased to 2 MB. With this, the empty area 146*b* increases from 6 MB to 8 MB.

A part (c) of FIG. 5 shows a case where a file, which is a request target, is not uploaded from the request destination user terminal 12 within another certain time limit from the state of the part (b) of FIG. 5. The storage area 146*c* is released from 2 MB, and is decreased to 0 MB. With this, the empty area 146*b* increases from 8 MB to 10 MB. FIG. 5 corresponds to step-by-step execution of the decrease processing in FIG. 4.

Figure 6:
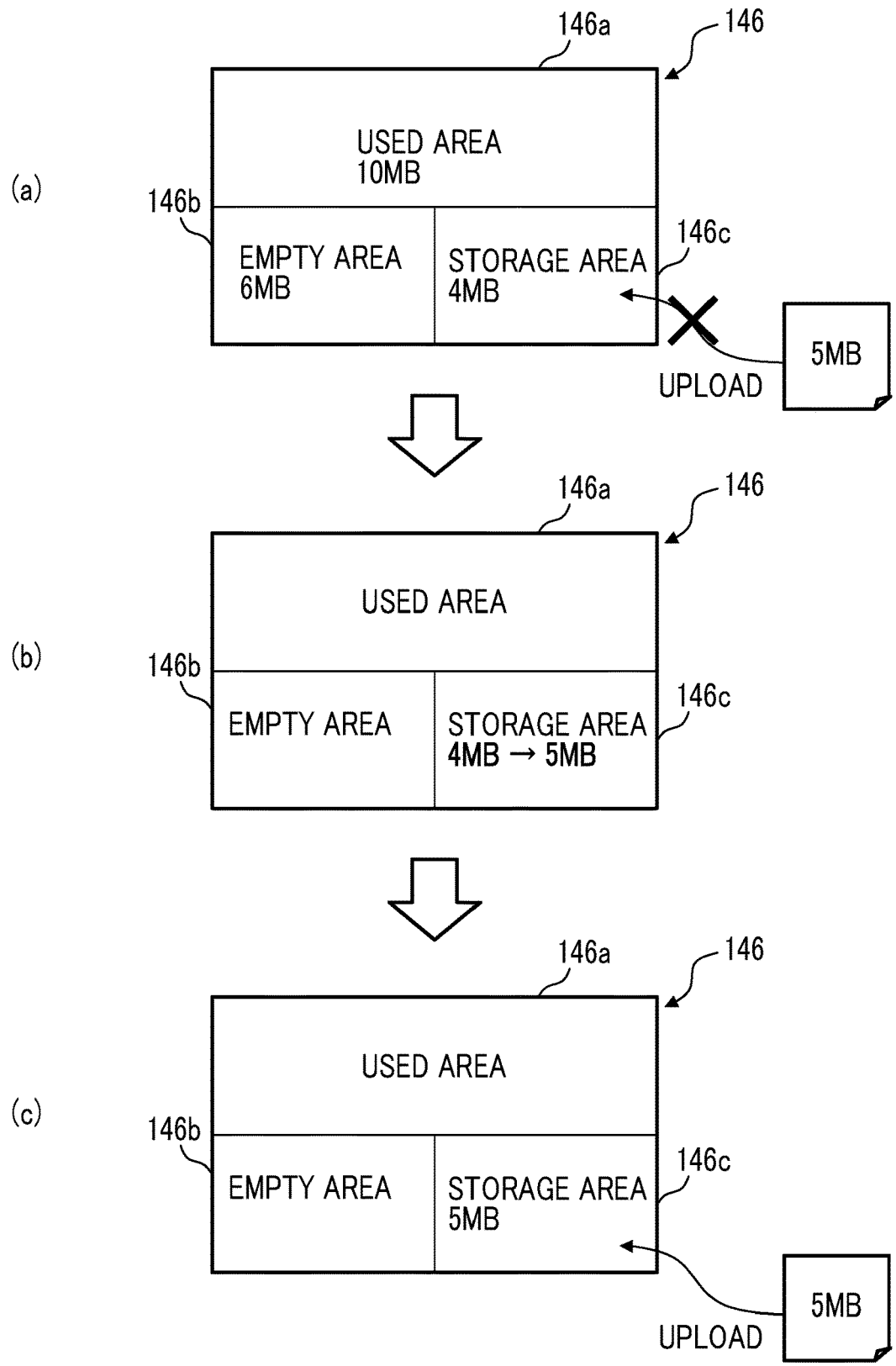
FIG. 6 is a (fourth) schematic diagram showing the change in the secured capacity of the exemplary embodiment.

FIG. 6 schematically shows still another secured capacity change of the storage area according to a storage status, which is executed by the control device 141.

A part (a) of FIG. 6 shows an initial state of the storage area. As in the part (a) of FIG. 3, for example, 4 MB, out of 10 MB of the empty area, is secured as the storage area 146*c*. That is, secured capacity=4 MB is satisfied.

In a case where a file such as a document is uploaded from the request destination user terminal 12 to the shared server 14 in this state, the control device 141 stores the uploaded file in the storage area 146*c* as shown in FIG. 3. However, in a case where a size of the uploaded file exceeds the secured capacity of 4 MB, for example, in a case where the size is 5 MB, the file cannot be stored in the storage area 146*c*.

In a case where it is determined that the size of the uploaded file exceeds the secured capacity of the storage area 146*c*, the control device 141 increases the secured capacity of the storage area 146*c*.

A part (b) of FIG. 6 shows a state where the secured capacity of the storage area 146*c* is increased. The secured capacity of the storage area 146*c* is increased from the initial state of 4 MB to, for example, 5 MB. With this, the empty area 146*b* decreases from 6 MB to 5 MB. Even in a case where the uploaded file size is 5 MB, the file can be stored in the storage area 146*c* by increasing the secured capacity of the storage area 146*c*. In a case of changing the secured capacity of the storage area 146*c*, the control device 141 may change the secured capacity according to a request from the client user terminal 10 or the request destination user terminal 12 in addition to automatically changing the secured capacity in accordance with the processing program. In addition, in a case of changing the secured capacity of the storage area 146*c*, the client user terminal 10 or the request destination user terminal 12 may be notified of the change.

After changing the secured capacity, the file is stored in the storage area 146*c* as shown in apart (c) of FIG. 6. Since the secured capacity is equal to the file size in this example, the secured capacity is not controlled (not necessary) to decrease even after the file is stored. In a case where there is a remaining capacity in the storage area 146*c* after the file is stored, the secured capacity is controlled to decrease as in the part (c) of FIG. 3.

Figure 7:
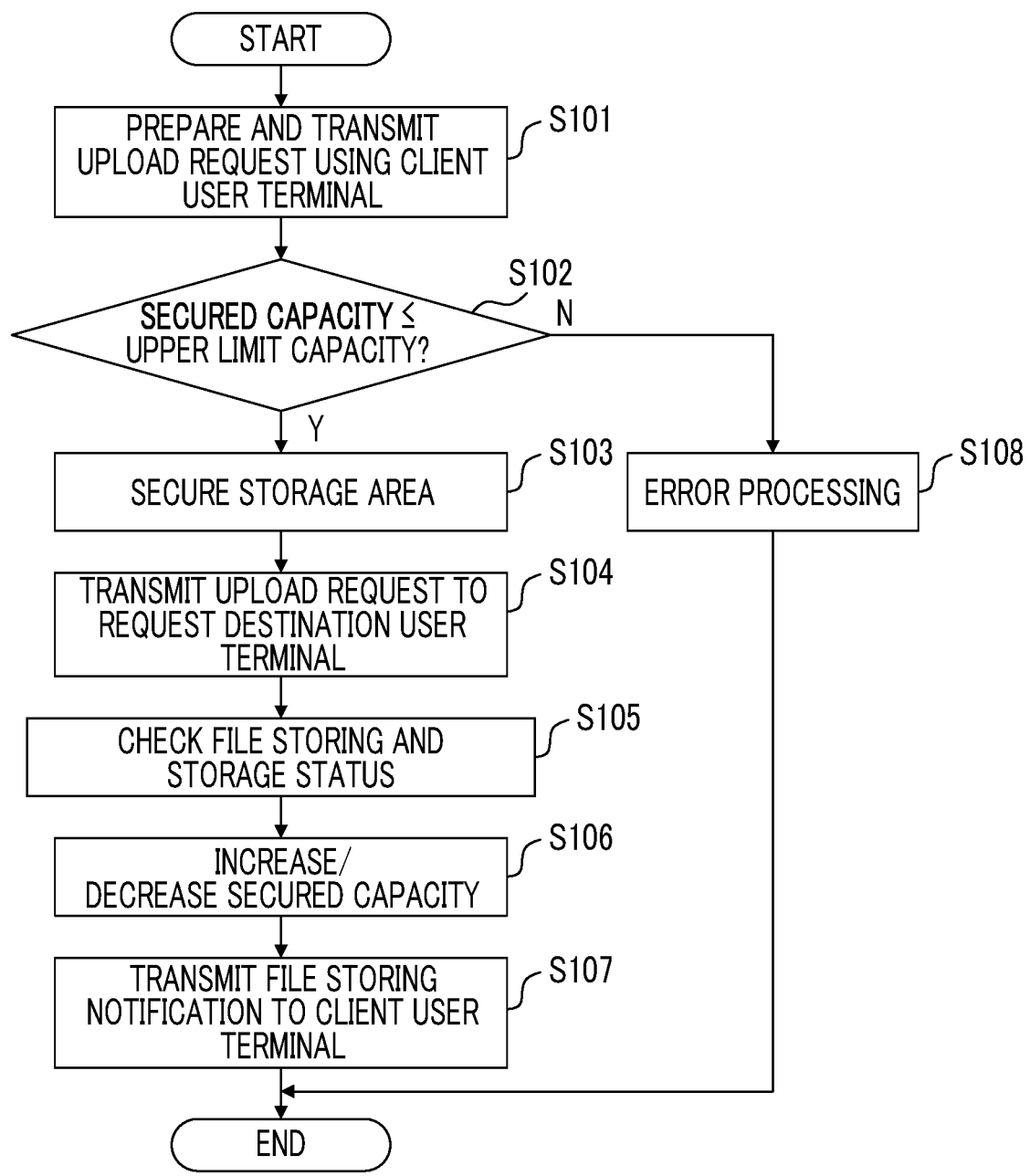
FIG. 7 is an overall processing flow chart of the exemplary embodiment.

FIG. 7 shows an overall processing flow chart of the exemplary embodiment. In the processing flow chart, for example, the client user is a registered user having authority to use the shared server 14, and the request destination user is an unregistered user.

First, the client user operates the client user terminal 10 to prepare an upload request (S101). The request may be prepared by starting an application program downloaded from the shared server 14, or may be prepared by starting an application program that operates on a web browser. The upload request includes request destination user information and request target file information, and the request target file information includes a file size and the number of files. A preparation screen for preparing an upload request is displayed on the client user terminal 10, and the client user inputs necessary items into the preparation screen displayed on a screen of the client user terminal 10 to prepare an upload request. The preparation screen may display a method of notifying the request destination user and an uploading method for the request destination user. For example, the following can be displayed.

"A link through which a document can be uploaded is transmitted by email. A person who has received the mail can upload a document by accessing from the link"

The client user terminal 10 logs into the shared server 14 by using authentication information such as an ID and a password, and transmits the prepared upload request to the shared server 14.

In a case where the upload request from the client user terminal 10 is received, the control device 141 of the shared server 14 secures the storage area 146c in the file sharing area 146 of the storage device 145. Prior to this, however, the control device checks whether the secured capacity is equal to or smaller than the upper limit capacity of the file sharing area 146 (S102). In a case where the secured capacity exceeds the upper limit capacity (NO in S102), the storage area cannot be secured. Therefore, the control device sends an error message indicating that the storage area cannot be secured to the client user terminal 10 as a reply to the upload request (S108).

In a case where the secured capacity is equal to or smaller than the upper limit capacity (YES in S102), the storage area 146c is secured in the file sharing area 146 (S103). In a case where there is no used area 146a in the file sharing area 146, the storage area 146c is secured such that the following is satisfied.

(Upper limit capacity of file sharing area)>Secured capacity

In a case where there is the already used area 146a, the storage area 146c is secured such that the following is satisfied.

(Upper limit capacity of file sharing area−Used capacity)>Secured capacity

In a case where a difference between the upper limit capacity of the file sharing area 146 and the used capacity is equal to or smaller than a lower limit value determined in advance, processing proceeds to processing of S108 assuming that there is no sufficient empty capacity allowing the storage area 146c to be secured, and an error message may be sent as a reply.

In a case where the storage area 146c is secured in the file sharing area 146, the control device 141 transmits an upload request notification to the request destination user terminal 12 by using the request destination user information included in the upload request, for example, a mail address of the request destination user (S104). The upload request notification includes client user information, request target file information, and identification information of the storage area 146c secured in the file sharing area 146. The identification information of the storage area 146c is information necessary for the request destination user, who is an unregistered user, to access the storage area, and is, for example, a URL of the storage area. Considering that the upload request is made to the unregistered user, it is appropriate that the storage area 146c can be accessed without logging into the shared server 14.

The control device 141 is brought into a receipt standby state of a file such as a document from the request destination user terminal 12 after transmitting the upload request notification to the request destination user terminal 12. In a case where there is upload from the request destination user terminal 12, the control device receives the uploaded file to store in the storage area 146c. In addition, in parallel with this processing, processing of checking the storage status of the storage area 146c is executed (S105).

After storing the uploaded file in the storage area 146c in parallel with checking the storage status, the control device 141 changes the secured capacity of the storage area 146c by increasing/decreasing the secured capacity according to the storage status (S106). In a case where the uploaded file is stored in the storage area 146c, the control device 141 notifies the client user terminal 10 of the storage (S107). In addition, in a case where the secured capacity is increased/decreased in S106, the client user terminal 10 or the request destination user terminal 12 may be notified of the change. Specifically, in a case where the secured capacity is decreased after storing the uploaded file, the client user terminal 10 is notified of the decrease. In a case where the secured capacity is decreased since the file is not stored within a certain time limit, the client user terminal 10 and the request destination user terminal 12 are notified of the decrease. In a case where the secured capacity is increased since the uploaded file size exceeds the secured capacity, the client user terminal 10 and the request destination user terminal 12 are notified of the increase. In a case of increasing the secured capacity, that is, in a case where the secured capacity is increased according to a request from the client user terminal 10 or the request destination user terminal 12, a notification of the increase may not necessarily have to be made. That is because the client user or the request destination user has intended the increase.

Figure 8:
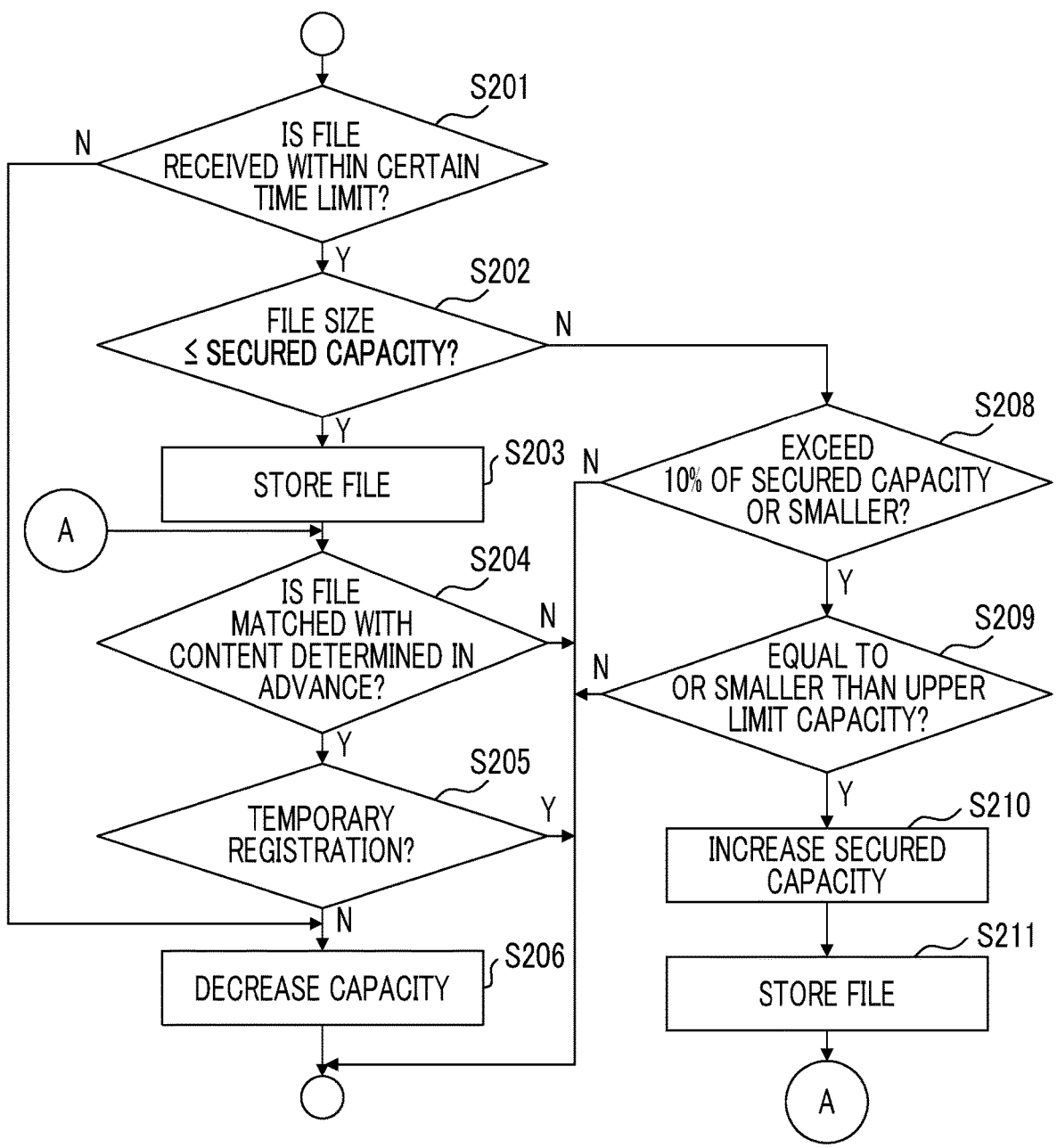
FIG. 8 is a detailed flow chart of some processing of FIG. 7.

FIG. 8 shows a detailed flow chart of the processing of S105 and S106 in FIG. 7.

After notifying the request destination user terminal 12 of the upload request, the control device 141 transitions to an upload from the request destination user terminal 12 standby state. The request destination user terminal 12 receives the upload request notification from the shared server 14 and displays the notification onto a display device. The request destination user accesses the storage area 146c by using information for identifying the storage area 146c displayed on the display device, for example, a URL, and uploads a file, which is a request target.

The control device 141 checks whether or not a file such as a document is received from the request destination user terminal 12 within a certain time limit in the upload standby state (S201). A start time point of the certain time limit is a time point when the storage area 146c is secured by the control device 141, or a time point when the request destination user terminal 12 is notified of the upload request. An end time point of the certain time limit may be any time set by the control device 141, for example, three days, or may be a time limit included in the upload request received from the client user terminal 10. The certain time limit functions as an effective time limit until which the request destination user terminal 12 can access the storage area 146c.

In a case where the file is not received within the certain time limit (NO in S201), the control device 141 releases the secured capacity of the storage area 146c to decrease the secured capacity to zero (S206). At this time, the secured capacity may be decreased to zero step by step as shown in FIG. 5.

In a case where the file is received within the certain time limit (YES in S201), the control device 141 determines whether or not the file size of the received file is equal to or smaller than the secured capacity of the secured area (S202).

In a case where the file size is equal to or smaller than the secured capacity (YES in S202), the received file is stored in the storage area (S203). Then, it is determined that whether or not the stored file is a file having content determined in advance (S204). The content determined in advance is content of the upload request transmitted from the client user terminal 10, and is a file name of a request target or the number of files which are request targets. Regardless of matching of file names, whether or not the number of files stored matches the number of files requested may be determined, or in short, whether or not at least the number of files stored matches the number of files determined in advance may be determined. In a case where the content of the stored file matches request content determined in advance (YES in S204), whether or not to select temporary registration (S205) is further determined. The temporary registration means temporary uploading when a document planned to be uploaded exists subsequent to a document intended to be uploaded now. In a case where temporary registration is selected, the request destination user terminal 12 can continue uploading a file different from the uploaded file to the storage area 146c. Definitive registration means that there is no more file to be uploaded and upload processing is completed.

In a case where the requested file matches the content determined in advance (YES in S204), and definitive registration is selected instead of temporary registration (NO in S205), the secured capacity of the storage area is released, that is, the secured capacity is decreased to zero (S206).

In a case where the stored file does not match the content determined in advance (NO in S204), or temporary registration is selected (YES in S205), secured capacity decrease processing is not executed.

On the other hand, in a case where the file size exceeds the secured capacity (NO in S202), it is determined next that whether or not the file size exceeds the secured capacity by an amount that is equal to or smaller than a threshold, for example, whether or not the file size exceeds the secured capacity only by an amount of 10% of the secured capacity or smaller (S208). In a case where the file size exceeds the secured capacity only by the amount that is equal to or smaller than the threshold (YES in S208), it is further determined that whether or not the file size is equal to or smaller than the upper limit capacity of the file sharing area (S209). In a case where the file size is equal to or smaller than the upper limit capacity (YES in S209), the secured capacity of the storage area 146c is increased (S210). An increase in the secured capacity is executed within a range that satisfies the following.

(Upper limit capacity of file sharing area−Used capacity)>Secured capacity.

An increased amount may be a fixed value, or may be a variable value. For example, an increased amount is set according to a difference amount between the secured capacity secured in S103 and the file size. After increasing the secured capacity, the received file is stored in the increased storage area (S211), and processing proceeds to processing for executing S204.

In a case where the file size exceeds the secured capacity by an amount exceeding the threshold, for example, in a case where the file size exceeds the secured capacity by an amount exceeding 10% of the secured capacity (NO in S208), the empty capacity of the file sharing area 146 is decreased, making the increase of the secured capacity in response to this a vain attempt. Then, the secured capacity is maintained as it is without an increase since the convenience of other users is compromised. Compared to a case of indiscriminately increasing the secured capacity just because the file size exceeds the secured capacity, the convenience of other users of the shared server can be kept with the secured capacity not increased in a case where a size by which the secured capacity is exceeded is equal to or larger than the threshold. Also in a case where the file size exceeds the upper limit (NO in S209), similarly, the secured capacity is maintained as it is without an increase.

In a case of YES in S205, that is, temporary registration is selected, a certain length of grace period is provided, and in a case where definitive registration is not made within the grace period, processing of decreasing the secured capacity may be executed. That is because the storage area 146c for the request destination user is continued to be maintained in vain, and the convenience of other users is not compromised. This means that processing of forcibly decreasing the secured capacity is executed in a case where registration is not completed within a certain length of time (for example, within 24 hours) after the first file upload is executed.

Although the secured capacity is increased in S210 in the example of FIG. 8, the control device 141 may notify the client user terminal 10 or the request destination user terminal 12 of the fact that the file size exceeds the secured capacity, and increase the secured capacity according to a secured capacity increase request from the client user terminal 10 or the request destination user terminal 12.

Figure 9:
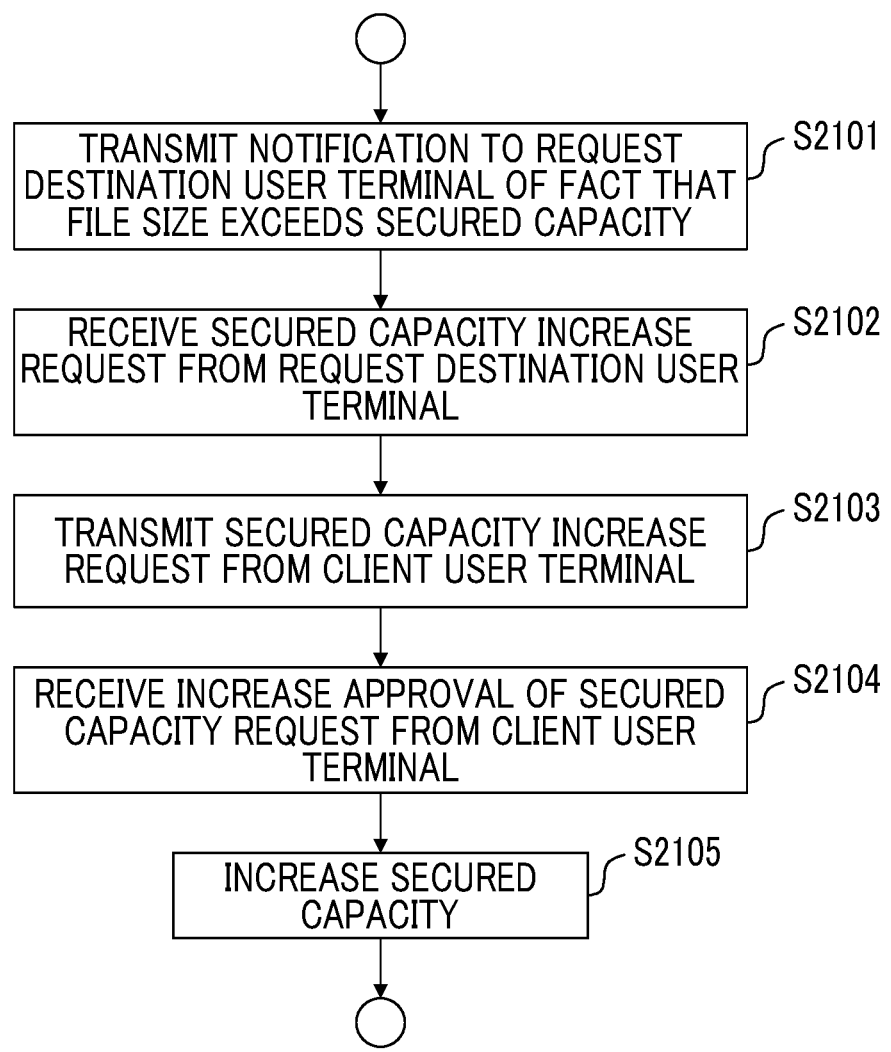
FIG. 9 is an alternative flow chart of some processing of FIG. 8.

FIG. 9 shows a processing flow chart of this case. FIG. 9 is an alternative processing flow chart of S210 in FIG. 8.

In a case of YES in S209 of FIG. 8, that is, the file size is equal to or smaller than the upper limit capacity, the control device 141 notifies the request destination user terminal 12 of the fact that the file size exceeds the secured capacity of the storage area (S2101).

In a case where the notification is received from the shared server 14, the request destination user terminal 12 displays the notification onto the display device. Then, the request destination user terminal 12 transmits a secured capacity increase request to the shared server 14 in response to the notification. For example, the notification from the shared server 14 is as follows.

"Upload cannot be performed since a designated capacity is exceeded.

Do you want to make a capacity increase request?" The request destination user transmits the secured capacity increase request to the shared server 14 by operating an OK button in response to this notification.

In a case where the increase request is received from the request destination user terminal 12 (S2102), the control device 141 transmits the increase request to the client user terminal 10 (S2103). For example, the following message is transmitted by mail.

"An area increase request is received from the request destination in response to the upload request.

In a case of approving the increase, please increase through the link below."

The client user terminal 10 receives the increase request from the shared server 14 and displays the request onto the display device. The client user terminal 10 transmits the approval of the secured capacity increase in response to the increase request to the shared server 14.

In a case where the increase approval from the client user terminal 10 is received (S2104), the control device 141 increases the secured capacity (S2105). After then, the file is stored in the storage area increased by performing the processing of S211 in FIG. 8.

Next, a screen displayed by the display devices of the client user terminal 10 and the request destination user terminal 12 of the exemplary embodiment will be specifically described.

FIG. 10 shows an example of a preparation screen of an upload request, which is displayed onto the display device of the client user terminal 10.

As a title of the screen, the following is displayed "Document receipt"

And then, as description of the document receipt, the following is displayed.

"A link through which a document can be uploaded is transmitted by mail. A person who has received the mail can upload a document without logging in by accessing from the link within an effective time limit. In a case where you want to set a password, a password can be set from a button on the lower left of the page."

Herein, "without logging in" means that upload can be performed even in a case where the upload request destination user is an unregistered user who does not have authority to use the shared server 14. In a case where the upload request destination user is a registered user who has authority to use the shared server 14, it is evident that upload can be performed after logging in.

In addition, input fields for inputting a name, a mail destination, an effective time limit of receipt, a title of an outgoing mail are displayed. A mail address of the request destination user is input as the mail destination. The effective time limit of receipt is an effective time limit of upload, and corresponds to the certain time limit of S201 in FIG. 8. A document name of an upload request target is input as the title of an outgoing mail. In addition, a button of "detailed setting" is displayed on the lower left, and by operating the button, a detailed setting screen appears in a case of setting detailed items such as password setting.

FIG. 11 shows an example of the detailed setting screen. Input fields of password setting, an upper limit of a size of a file that can be uploaded, and an upper limit of the number of files that can be uploaded are displayed. Password may be any setting. In a case where a password is set, the request destination user uploads a document after setting the password, thereby securing security. The upper limit of a size of a file that can be uploaded is a capacity that serves as a criterion in a case where the control device 141 secures the storage area 146c in the file sharing area 146, and corresponds to the secured capacity in an initial state. The client user prepares an upload request by inputting the information into the input fields, and transmits the upload request to the shared server 14 by operating an "OK" button displayed on the lower right of FIG. 10.

FIG. 12 shows an example of a screen of an upload request from the shared server 14, which is displayed onto the display device of the request destination user terminal 12. By using a mail address input as a mail destination, which is input in the preparation screen of FIG. 10, the control device 141 transmits the upload request to the request destination user terminal 12 by mail. A name, a requester, a document receipt URL, and an effective time limit are displayed in the upload request mail. The requester is a name of the client user. The document receipt URL is a URL of the storage area 146c secured in the file sharing area 146 by the control device 141. The effective time limit is an effective time limit set by the client user in the preparation screen shown in FIG. 10. The request destination user can access the storage area 146c by clicking the document receipt URL.

FIG. 13 is an example of a screen for uploading, which is displayed in a case where the request destination user clicks the document receipt URL of FIG. 12. A message indicating that a document can be uploaded by the time limit is displayed, and a name, an effective time limit, an upper limit of the number of files, and a file size upper limit are displayed. The information is input in the preparation screens of FIG. 10 and FIG. 11. The request destination user sets a document, which is a request target, as a document to be uploaded, and uploads the set document by operating a "registration button" on the lower right.

FIG. 14 is an example of a screen in a case where the "registration button" in FIG. 13 is operated. "Temporary registration" and "complete registration" buttons are displayed, and description of each button is displayed. The "temporary registration" means temporary uploading when a document planned to be uploaded exists subsequent to a document intended to be uploaded now, and the request destination user operates the "temporary registration" button in a case of continuing the upload of a document. In a case where the registration of all documents is completed, the "complete registration" button is operated. The "temporary registration" corresponds to the temporary registration of S205 in FIG. 8, and the "complete registration" corresponds to the definitive registration with respect to the temporary registration.

FIG. 15 is an example of a screen transmitted from the shared server 14 in a case where the file size exceeds the secured capacity, which is displayed on the display device of the request destination user terminal 12. The following message is displayed.

"Upload cannot be performed since the designated capacity is exceeded by 20 MB.

Do you want to make a capacity increase request?" Herein, "20 MB" is a difference between the file size and the secured capacity, and the difference is calculated by the control device 141. In a case where the request destination user operates a "yes" button, the request destination user terminal 12 transmits a capacity increase request to the shared server 14.

FIG. 16 is an example of a screen transmitted from the shared server 14 in a case where the capacity increase request is transmitted from the request destination user terminal 12, which is displayed on the display device of the client user terminal 10. The following message is displayed.

"An area increase request is received from a user A in response to the upload request.

In a case of approving the increase, please increase through the link below."

In addition, a URL to be accessed in order to increase the secured capacity is also displayed. Herein, the "user A" is the request destination user.

Figure 17:
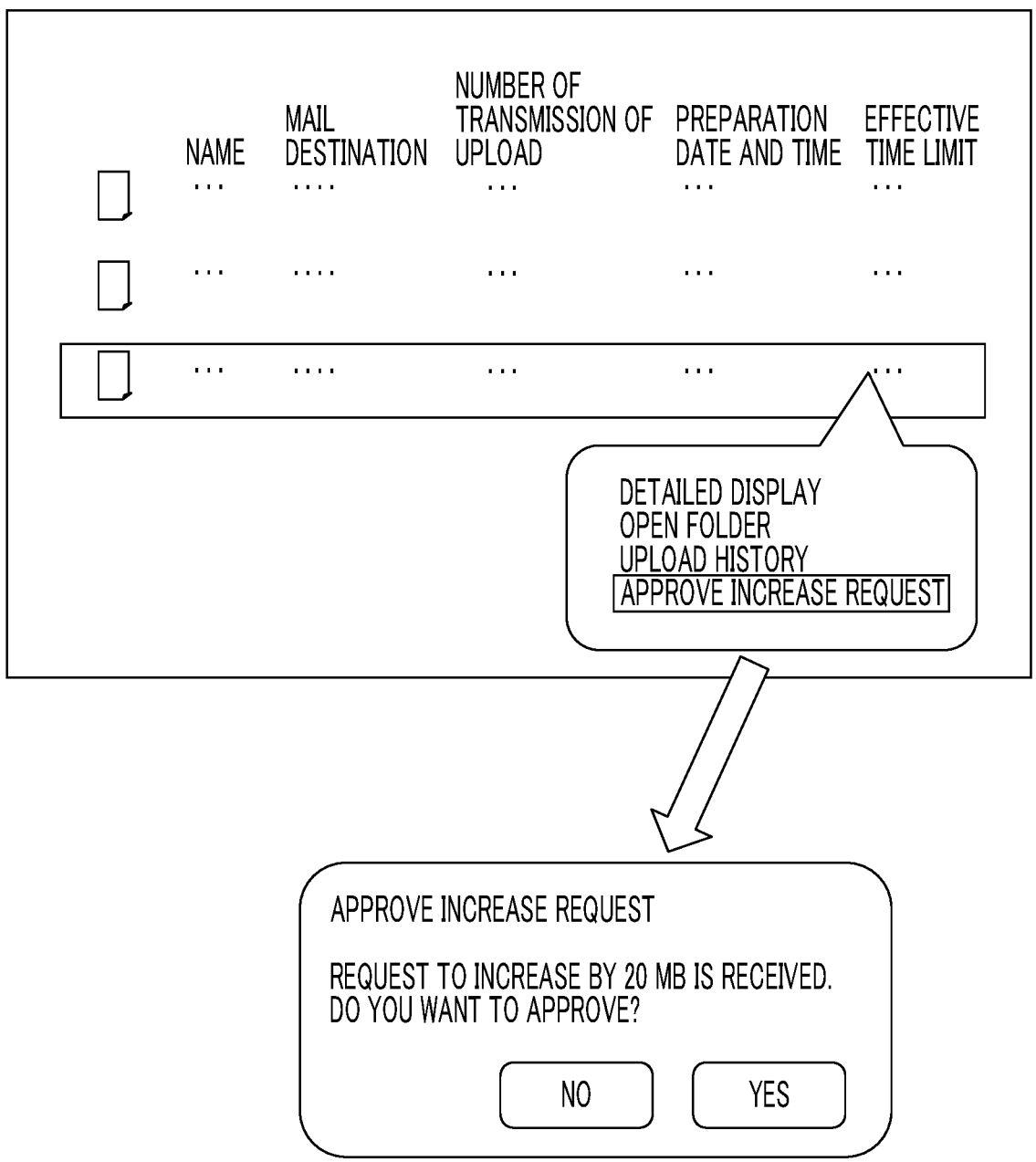
FIG. 17 is an (eighth) explanatory diagram showing an example of the screen of the exemplary embodiment.

FIG. 17 is an example of a screen displayed in a case where the client user clicks the URL displayed in FIG. 16. In a case where a plurality of upload requests exist, the request content thereof is listed and displayed. In a case where the client user selects an upload request indicating that a capacity is to be increased, from the list, the menu is displayed as follows as detailed menu.

Detailed display

Open a folder

Upload history

Approve an increase request

The "approve an increase request" is pop-up displayed in a case where a capacity increase request is received from the request destination user terminal 12. In a case where the client user selects the "approve an increase request", the following message is displayed.

"A request to increase by 20 MB is received.

Do you want to approve?"

In a case where the client user operates the "yes" button, the client user terminal 10 transmits the fact that a capacity increase is approved to the shared server 14.

Although the exemplary embodiment of the present invention is described hereinbefore, the present invention is not limited to the exemplary embodiment, and various modifications are possible. Hereinafter, modification examples will be described.

Modification Example 1

In the exemplary embodiment, in a case where a stored file in the storage area has content determined in advance, that is, a file name of a request target matches the stored file name or the number of files matches the number of stored files, the secured capacity is decreased. In a case otherwise, the secured capacity is not decreased. However, in a case where the stored file in the storage area does not have the content determined in advance, for example, in a case where the stored file is a file having a file name that does not match the file name of the request target, the secured capacity may be increased for the sake of a file to be originally uploaded, instead of decreasing the secured capacity. Although an increased amount is any amount, the storage area is wasted by a mistakenly stored file size. Therefore, to compensate for this, the storage area is increased by the mistakenly stored file size.

Modification Example 2

The secured capacity is released, that is, decreased to zero in a case where a file is stored in the storage area in the exemplary embodiment. However, in a case where a file is stored as well, the secured capacity may be decreased to zero through a plurality of stages in turn such that the secured capacity is decreased to zero through a plurality of stages in turn as shown in FIG. 5 in a case where a file is not stored. For example, when the remaining capacity of the storage area 146c becomes 2 MB as a result of securing 4 MB as the secured capacity of the storage area 146c in an initial state and storing 2 MB of file in the storage area 146c in FIG. 3, first, the secured capacity is released by 1 MB, and next, the remaining 1 MB is released after a certain length of time has passed until the secured capacity is finally decreased to zero, instead of decreasing the secured capacity to zero MB by releasing 2 MB of the remaining capacity all at once. By decreasing step by step, it is possible to flexibly respond to the upload of an additional file from the request destination user terminal 12 as well.

Modification Example 3

In the exemplary embodiment, the control device 141 may determine whether the request destination user is a registered user or an unregistered user, and change the secured capacity only in a case where the request destination user is an unregistered user. That is because in a case where the request destination user is a registered user, the file sharing area 146 has the storage area 146c which is already assigned thereto, and thus the secured capacity can be increased or decreased as appropriate according to necessity. In addition, instead of changing the secured capacity with respect to all unregistered users, the secured capacity may be changed only with respect to a certain unregistered user. For example, in a case where the request destination user is an unregistered user who does not have past upload history, the secured capacity is decreased. However, in a case where the request destination user is an unregistered user who has past upload history, the secured capacity is maintained without decreasing. Alternatively, in a case where the request destination user is an unregistered user who belongs to a certain group, the secured capacity is decreased. In a case where the request destination user is an unregistered user who belongs to a group other than the certain group, the secured capacity is maintained without decreasing. Switching control may be performed as to whether or not to change the secured capacity according to an attribute of an unregistered user.

Modification Example 4

In Modification Example 3, in a case where the secured capacity is changed only in a case of an unregistered user, a degree to which the secured capacity is decreased may be changed according to an attribute of the unregistered user. That is, in a case of an unregistered user having a first attribute, the secured capacity is decreased in a first aspect, and in a case of an unregistered user having a second attribute which is different from the first attribute, the secured capacity is decreased in a second aspect which is different from the first aspect. For example, the secured capacity is decreased step by step with respect to an unregistered user who has past upload history, and the secured capacity is decreased all at once to zero with respect to an unregistered user who does not have past upload history.

Figure 18:
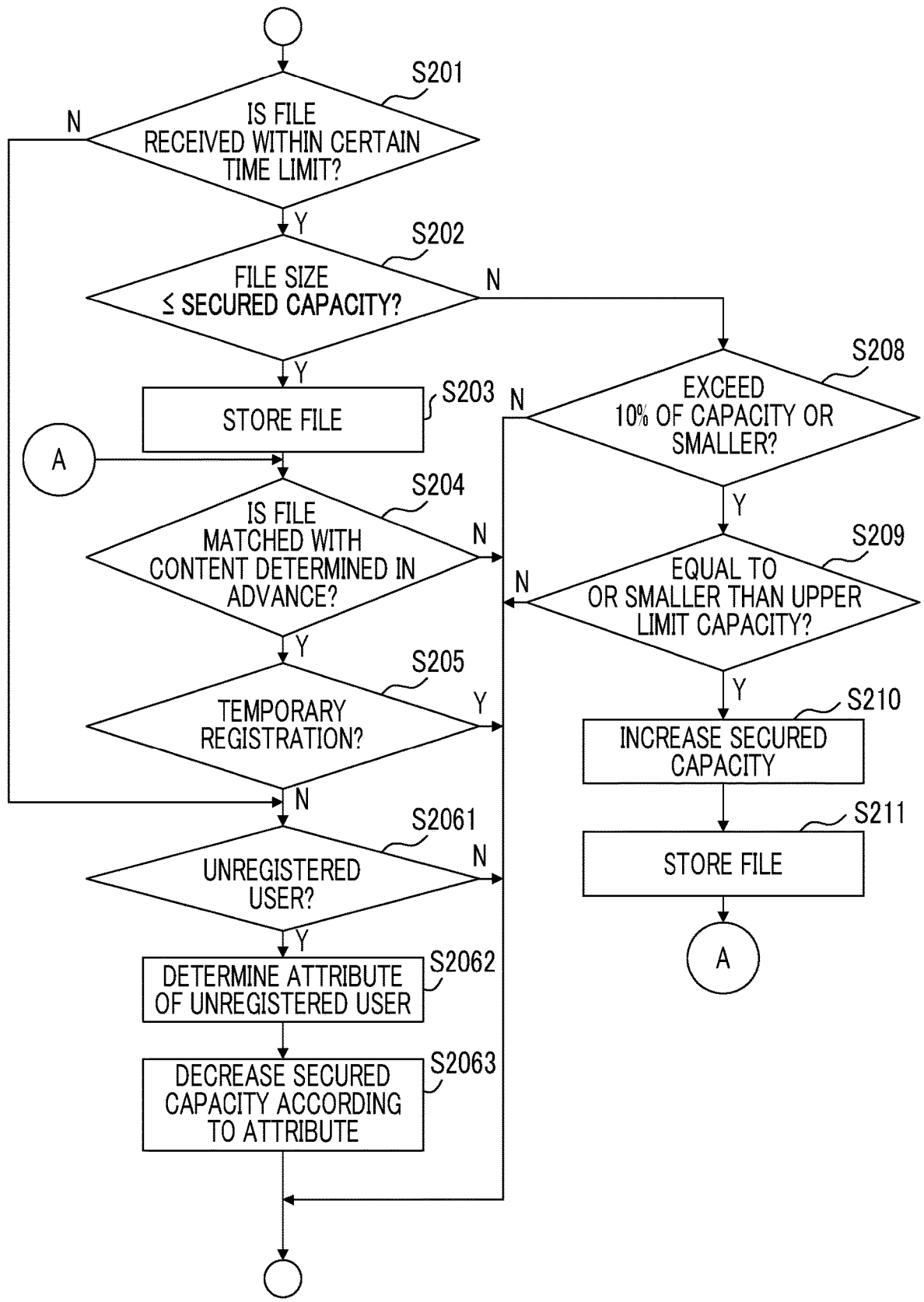
FIG. 18 is a processing flow chart of a modification example.

FIG. 18 is a processing flow chart of a modification example. FIG. 18 is a processing flow chart corresponding to the processing of FIG. 8 in the exemplary embodiment. What is different from FIG. 8 is that processing of S2061 to S2063 is executed instead of the secured capacity increasing processing of S206 in FIG. 8.

That is, in a case where definitive registration is selected instead of temporary registration (NO in S205), the control device 141 further determines whether or not the request destination user who has uploaded a file is an unregistered user (S2061). The determination may be made from a mail address of a mail destination or a name of the request destination user at a timing when an upload request is received from the client user terminal 10. In a case where the request destination user is not an unregistered user (NO in S2061), that is, in a case of a registered user, secured capacity decrease processing is not executed. In a case of an unregistered user (YES in S2061), an attribute of the unregistered user is further determined (S2062). Specifically, the attribute is past upload history, a belonging organization or group, importance, and a security level. Then, the secured capacity is decreased based on an aspect according to the determined attribute (S2063). An aspect of decrease includes both of temporal and quantitative decreases, and in a case where an attribute differs, an aspect of decrease differs as well.

Although an aspect of decrease differs according to an attribute of an unregistered user in a case of decreasing the secured capacity in FIG. 18, an aspect of increase may differ according to an attribute of an unregistered user in a case of increasing the secured capacity.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor coupled to and configured to control a non-transitory storage medium in a shared server at least by:
 allocating, within the non-transitory storage medium, a file sharing area;
 securing a storage area within the file sharing area in the shared server; and
 changing dynamically a secured capacity of the storage area relative to an empty area and a used area of the file sharing area according to a storage status of the storage area, wherein dynamically changing the secured capacity of the storage area comprising: receiving a file comprising a file size which is less than the storage area; and configuring a total size of the storage area as the file size of the file and releasing a remaining area of the storage area to be absorbed by the empty area.

2. The information processing apparatus according to claim 1, wherein the processor is further configured to store the file in the storage area by an unregistered user who is not registered in advance for using the shared server.

3. The information processing apparatus according to claim 2,
 wherein the processor is further configured to control the secured capacity to decrease when the file is stored in the storage area.

4. The information processing apparatus according to claim 3, wherein the processor is further configured to control the secured capacity to decrease when the file is stored in the storage area comprising: wherein the processor is further configured to control the secured capacity to decrease when the file is stored in the storage area and a certain length of time passes.

5. The information processing apparatus according to claim 3, wherein the processor is further configured to control the secured capacity to decrease when the file is stored in the storage area comprising:
 wherein the processor is further configured to control the secured capacity to decrease when the file is stored in the storage and the file has content determined in advance.

6. The information processing apparatus according to claim 2,
 wherein the processor is further configured to control the secured capacity to decrease when a certain time limit passes after the storage area is secured.

7. The information processing apparatus according to claim 2,
 wherein the unregistered user is a user who receives a storing request from a registered user who is registered in advance for using the shared server.

8. The information processing apparatus according to claim 7,
 wherein the processor is further configured to make a change in the secured capacity different according to an attribute of the unregistered user.

9. The information processing apparatus according to claim 1,
 wherein the processor is further configured to control the secured capacity to decrease when the file is stored in the storage area.

10. The information processing apparatus according to claim 9,
 wherein the processor is further configured to control the secured capacity to decrease when the file is stored in the storage area comprising: the processor is further configured to control the secured capacity to decrease when the file is stored in the storage area and a certain length of time passes.

11. The information processing apparatus according to claim 9, wherein the processor is further configured to control the secured capacity to decrease when the file is stored in the storage area comprising:
 wherein the processor is further configured to control the secured capacity to decrease when the file is stored in the storage and the file has content determined in advance.

12. The information processing apparatus according to claim 11, wherein the processor is further configured to control the secured capacity to increase by a size of the file when the file does not have the content determined in advance.

13. The information processing apparatus according to claim 11, wherein the processor is further configured to control the secured capacity to decrease when the file is stored in the storage area comprising:
 wherein the processor is further configured to control the secured capacity to decrease when the file is stored in the storage area and there are a predetermined number of the files.

14. The information processing apparatus according to claim 9,
 wherein processor is further configured to not control the secured capacity to decrease when the file is temporarily stored.

15. The information processing apparatus according to claim 9, wherein the processor is further configured to control the secured capacity to decrease when the file is stored in the storage area comprising:
 wherein the processor is further configured to control the secured capacity to decrease to zero when the file is stored in the storage area.

16. The information processing apparatus according to claim 15, wherein the processor is further configured to control the secured capacity to decrease to zero comprising:
 wherein the processor is further configured to control the secured capacity to decrease to zero through a plurality of stages.

17. The information processing apparatus according to claim 1, wherein the processor is further configured to control the secured capacity to decrease when a certain time limit passes after the storage area is secured.

18. The information processing apparatus according to claim 1,
 wherein the processor is further configured to control the secured capacity to increase when a size of a file to be stored in the storage area exceeds the secured capacity.

19. The information processing apparatus according to claim 18,
 wherein the processor is further configured to not control the secured capacity to increase when the size of the file to be stored in the storage area exceeds a threshold.

20. A non-transitory computer readable medium storing a program causing a computer comprising a processor to execute:
 allocating, within the non-transitory computer readable medium, a file sharing area;
 securing a storage area within the file sharing area in the shared server; and
 changing dynamically a secured capacity of the storage area relative to an empty area and a used area of the file sharing area according to a storage status of the storage area, wherein dynamically changing the secured capacity of the storage area comprising: receiving a file comprising a file size which is less than the storage area; and configuring a total size of the storage area as the file size of the file and releasing a remaining area of the storage area to be absorbed by the empty area.

21. An information processing apparatus comprising:
a processor coupled to and configured to control a non-transitory storage medium in a shared server at least by:
allocating, within the non-transitory storage medium, a file sharing area;
securing a storage area within the file sharing area in the shared server;
changing dynamically a secured capacity of the storage area relative to an empty area and a used area of the file sharing area according to a storage status of the storage area;
receiving a file and storing the file in the storage area; and
control the secured capacity to decrease to zero when the file is stored in the storage area.

* * * * *